April 2, 1963 H. F. CHAPELL 3,084,275

DELAY LINES FOR TRAVELING WAVE TUBES

Filed Sept. 28, 1959

INVENTOR
HARRY F. CHAPELL
BY H. Vincent Harsha
ATTORNEY

United States Patent Office 3,084,275

Patented Apr. 2, 1963

3,084,275

DELAY LINES FOR TRAVELING WAVE TUBES

Harry F. Chapell, Maynard, Mass., assignor to Raytheon Company, Lexington, Mass., a corporation of Delaware Filed Sept. 28, 1959, Ser. No. 842,692
11 Claims. (Cl. 315—3.6)

The present invention relates to traveling wave tubes and is particularly directed to improvements in the construction of delay lines forming, for example, a part of a traveling wave tube.

The present invention has for its object to provide a delay line having at least one sharp angular bend for use for example, at an output transition or to redirect microwave energy into a space saving attenuator.

Up to the present, delay lines used in traveling wave tubes have extended in a single plane substantially throughout the entire length of the tube envelope. In the rectilinear traveling wave tube the length of the tube is and must be at least as long as the required length of the delay line. In the circular wave tube the delay line is made circular and in this instance the diameter of the tube, instead of its length as in the case of the rectilinear type tube, is again determined by the required length of the delay line. In both of the above cases the size factor of the tube is large and cannot be reduced. It is known to turn a corner with a delay line by making the delay line follow a curve of small but significant radius. It is further known to match a delay line to a rectilinear waveguide by utilizing a horn shaped matching and coupling device having an internal ridge or plate which progressively narrows the internal section of the coupling devices. Such systems and devices have a number of disadvantages: In the first place, the requirements of many applications result in a rectilinear tube being undesirably long. In the second place the same applications will result in a circular tube having an undesirably large diameter. An important and additional direct disadvantage resulting from the inability to reduce the size factor of traveling wave tubes is that the weight of such tubes are quite high because of the large magnets that must be used therewith. In the third place even where a curve of small significant radius is used the size factor is still large to a greater or lesser extent and more important, satisfactory components comprising the curve are especially difficult and expensive to produce. In the fourth place coupling devices between a guide and a delay line will do only just that and will not provide a delay line that is not coplanar, i.e., turns a corner.

In accordance with one embodiment of the present invention in which these difficulties are at least to a great extent avoidid, two delay lines or, alternately, two portions of a single delay line are led to a meeting point whereat there is located a single transition element forming a part of both delay lines. The transition element is so shaped and positioned that (1) a surface thereof is exposed to each delay line that resembles the periodically repeated delay elements of that delay line and which occupy in space a location corresponding to an extension of the geometrically periodic structure, and (2) an end surface perpendicular to the aforementioned surface is provided on the transition element so shaped and positioned as to match the impedance of the delay lines one with another.

Figure 1:
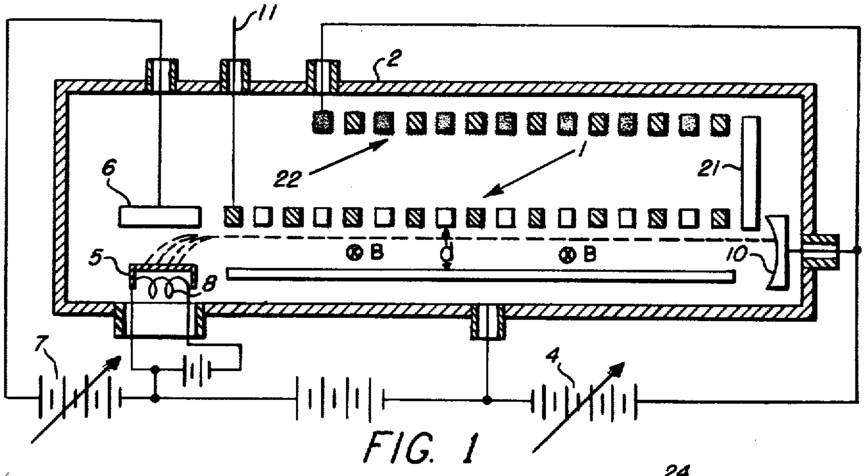
FIG. 1 is a longitudinal section through a rectilinear type crossed field traveling wave tube constructed in accordance with the invention.

Referring now to FIG. 1 which shows a rectilinear crossed field backward wave oscillator tube, a delay line 1 constructed so that its fundamental mode of wave propagation is a backward (or reverse) wave, is shown extending substantially throughout the entire length of the tube envelope 2. The tube envelope 2 is fabricated of a non-magnetic metallic material and is provided with insulative seals at various convenient locations through which electrical connections are made to elements housed in the envelope. The delay line 1 may be any wave propagating structure of the periodic type having suitable properties and is conventionally of the interdigital type, although one may substitute other configurations, such as a ladder line. A planar electrode 3, known as the "sole" is positioned parallel to the delay line structure and spaced therefrom by a distance *d*. A variable voltage source, here indicated by battery 4, establishes an electric field E in the interaction space bounded by the delay line 1 and sole 3, the latter being biased to a negative potential with respect to the delay line. A magnetic field B uniform throughout the interaction space is established by any convenient means (not shown), e.g. an electromagnet or permanent magnet. At one end of the tube there is positioned an electron gun symbolized by an electron emitting cathode 5 and an accelerating electrode 6 which is biased positively with respect to the cathode by battery 7. The cathode 5 encloses a heating element 8 which is connected to a suitable source of energy, such as battery 9. A collector electrode 10 is situated at the end of the tube opposite from the electron source. The output of the oscillator tube is obtained from an output coupling 11 connected to delay line 1 adjacent the gun end of the tube.

Figure 6:
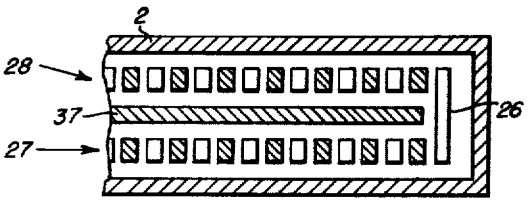

In conventional practice the envelope 2 is extended to such a length as to permit inclusion adjacent the collector of a number of delay elements that function as attenuators. The purpose of the attenuation is the absorption of wave energy to prevent reflection of waves from the collector end of the line. The attenuation may, for example, take the form of an iron coating adhering to the terminal digits or a lossy material inserted between the digits. However, in accordance with the present invention a transitional element 21 more thoroughly described hereinafter couples the delay line 1 to terminal delay elements comprising a terminal delay line 22 which extend backwardly from the transitional element 21 toward the electron gun. The elements of the terminal delay line 22 are stippled to indicate that attenuation has been provided in this portion of the line. The terminal delay elements or digits of delay line 22 are disposed from the delay line 1 a distance sufficient to prevent coupling between the delay elements of the two portions of the delay line. If desired, each portion of the delay line may be physically separated by a metal conductive wall such as, for example, as shown in FIG. 6 to provide better isolation and/or closer spacing of the delay line portions. As is well known in the art the magnetic field B established in the interaction space is normal to the electric field E and in such direction that electrons are impelled by the crossed fields toward the collector 10. A beam of electrons is injected by the electron gun into the interaction space and the electrons travel at a velocity $V_e$ which is substantially equal to the phase velocity of a component of a wave propagating along the delay line, the group velocity of said wave being in the direction opposite to the direction of travel of the electron beam. When the current of the beam is increased above a critical value, oscillations commence at a frequency determined by the electron velocity $V_e$. $V_e$ is the average translational electron velocity and is equal to $E/B$. The continuous field E, between anode 1 and sole 3, is equal to $V/d$, where V is the voltage provided by source 4. It follows, therefore, as V is varied, the electron velocity varies, and the wavelength of oscillation varies accordingly. The major interaction between the electron beam and the R.F. field on the delay line occurs at the output end of the line and little or no interaction occurs at the attenuation end of the line. In between these ends the interaction between the beam and the R.F. field gradually decreases as the electrons approach the attenuation region.

It may now be readily apparent that the construction as shown in FIG. 1 results in a substantially more compact tube than heretofore and that the rectilinear oscillator may be modified in conventional manner to form a circular tube employing a circular delay line and a concentric circular sole. In such a tube a cylindrical annular casing encloses a circular delay line and circular sole associated therewith. A cathode and an accelerating electrode similar to that shown in FIG. 1 is provided to supply an electron beam which traverses the interaction space bounded by the circular sole and the delay line and which is absorbed by a collector electrode. Similarly the output of the tube is obtained from the end of the delay line adjacent the electron gun by means of a suitable vacuum tight coupling which extends laterally through the casing. In this type of tube except for the output coupling all electrical connections to the input element of the tube are made by bringing the connecting leads to the center of the tube and then upwardly or downwardly through one or two cover plates, which together with the circular casing form an evacuated cylindrical housing. A magnetic field uniform throughout the interaction space is required and established by conventional means such as an electromagnetic or permanent magnet.

Utilization of the invention permits a substantial reduction in the required diameter of the circular tubes (and length of the rectilinear tubes) and a substantial savings in weight is achieved in addition to providing a more compact tube since a substantially smaller magnet, which constitutes a major portion of the weight of the tube, may be used. Further, such a tube does not require time consuming and expensive manufacturing procedures.

Figure 2:
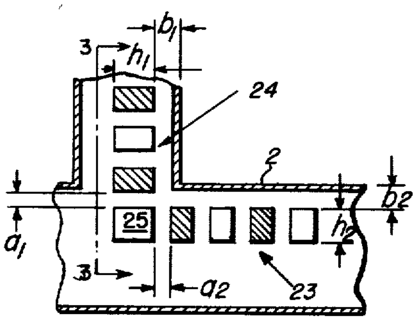
FIG. 2 is a longitudinal section with parts broken away of two delay lines at right angles in accordance with the invention and showing by way of example the relation of the various parts of the delay lines and transitional element.
Figure 3:
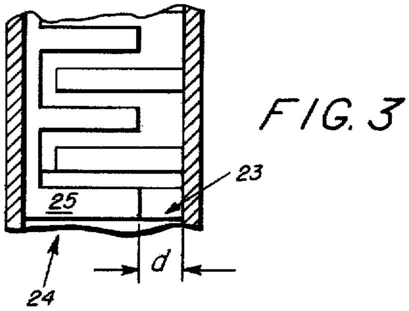
FIG. 3 is a transverse section on line 3—3 of FIG. 2.

FIGS. 2 and 3 show by way of example the various spacing and dimensions of two delay lines 23—24 at right angles and coupled together by a single transitional element 25. It is important to note that the transverse dimension $h_1$ need not equal the transverse dimension $h_2$ (see FIG. 2). If the aforementioned dimensions $h_1$ and $h_2$ are not equal then the ratio $a_1/h_1$ should equal the ratio $a_2/h_2$ to keep the impedance $Z_0$ of the lines equal. Further, the distances $b_1$ and $b_2$ may be arbitrarily selected and for the general case the distance $d$ (see FIG. 3) may be selected as equal to $$\frac{a_1+a_2}{2}$$

where $a_1$ is the periodical spacing of line 24, $a_2$ is the periodically spacing of line 23, and $d$ is the distance from the free end of the transitional element 25 to the enclosure 2. Because of the many and varied circumstances under which the invention may be applied no exact dimensions, location, or spacing of the transitional element can be practically given. They are best determined experimentally for each specific application. However, a good starting point would be a transitional element dimensioned as described above and shown in FIGS. 2–3, a proper and useful configuration being obtained when the transitional element is formed more or less in accordance with the teaching contained herein and when an optimum impedance match of the lines is obtained.

Figure 4:
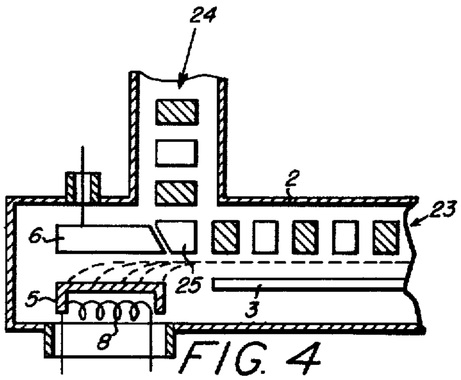
FIG. 4 is a longitudinal section with parts broken away of one application of the invention in a backward wave oscillator.

For the general case the dimensions $a$ and $h$ at the free end of the transitional element (see FIGS. 2–3) should have approximately the same ratio as that of the delay line. However, if the configuration of the transitional finger is varied from the geometrical configuration as shown, for example, in FIG. 2 to permit a more efficient association with an accelerating electrode, for example as shown in FIG. 4, this in effect varies the $h$ dimension, hence the $d$ dimension must be adjusted to provide an optimum impedance match, the $h$ and $a$ dimensions being determined by the configuration of the delay lines 23—24.

Figure 5:
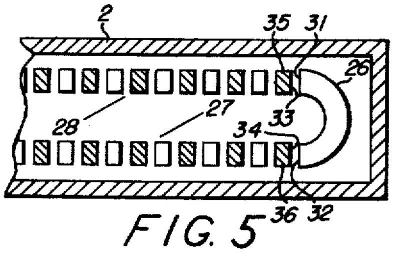
FIGS. 5 and 6 are partial views similar to FIG. 1 of modified forms of the invention.

FIGS. 5 and 6 show modifications of the delay line structure of FIG. 1. As shown in FIG. 5 the transitional element 26 forms a part of delay lines 27—28, the dimensions of the transitional element 26 being selected as described hereinabove to form at least in part a delay element with respect to each delay line 27—28 when viewed from that particular delay line. As shown by way of example in FIG. 5 each surface 31—32 of the transitional element 26 is perpendicular to the plane of the drawing and parallel to the exposed surfaces 33—34 of the respective delay elements 35—36 adjacent thereto and each surface 31—32 has a configuration at least equal respectively to that of the aforementioned exposed surfaces 33—34 of the delay element 35—36 adjacent thereto, all as described hereinbefore. FIG. 6 shows a further modification wherein the delay lines 27—28 are separated by a metallic conductive wall 37 and the transitional element 26 is rectangular in shape.

The invention is not limited to coupling of interdigital lines and is applicable to any delay line wherein the longitudinal axis of two portions of the line are displaced from and parallel one with another or are at an angle and intersect, the two lines being coupled by a single easily formed transitional element.

The invention is not limited to the examples which have been described but permits all modifications within the ability of one skilled in the art, and it will be obvious to those skilled in the art that various changes may be made therein without departing from the scope of the invention as set forth in the appended claims.

What is claimed is:

1. A traveling wave tube comprising: a first elongate delay line comprised of periodical elements; a second elongate delay line comprised of periodical elements and having a longitudinal axis displaced from the longitudinal axis of said first delay line; an elongate sole electrode spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; and a transition element for coupling said delay lines one to another, the dimensions of said transitional element being selected such as to form at least in part a periodical element with respect to each said delay line.

2. A traveling wave tube comprising: a first elongate delay line comprised of periodical elements; a second elongate delay line comprised of periodical elements and having a longitudinal axis displaced from the longitudinal axis of said first delay line; an elongate sole electrode spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; and a single transition element for coupling said delay lines one to another, the dimensions of said transitional element being selected such as to form a periodical element with respect to each said delay line when viewed from each delay line and to match the impedance of said delay lines one with another.

3. A traveling wave tube comprising: a first elongate delay line comprised of delay elements; a second elongate delay line comprised of delay elements and having a longitudinal axis displaced from the longitudinal axis of said first delay line; an elongate sole electrode spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; and a transition element forming a part of both said delay lines for coupling said delay lines one to another, the dimensions of said transitional element being selected such as to form a delay element having a surface exposed to each said delay line, each said surface being parallel to the exposed surface of the element adjacent thereto and having a configuration at least equal to that of the said exposed surface of said delay element adjacent thereto.

4. A traveling wave tube comprising: a first elongate delay line comprised of delay elements; a second elongate delay line comprised of delay elements and having a longitudinal axis displaced from the longitudinal axis of said first delay line; an elongate sole electrode spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; and a transition element forming a part of both said delay lines for coupling said delay lines one to another, the dimensions of said transitional element being selected such as to form a delay element having a surface exposed to each said delay line, each said surface being parallel to the exposed surface of the element adjacent thereto and having a configuration at least equal to that of the said exposed surface of said delay element adjacent thereto, each said surface of said transitional element being spaced from each adjacent delay element by a distance equal to the periodic spacing between adjacent surfaces of the delay line to which it is exposed.

5. In a traveling wave tube the combination comprising: a first elongate delay line of geometrically periodic structure having delay elements; a second elongate delay line of geometrically periodic structure having delay elements and having a longitudinal axis at right angles to and intersecting the longitudinal axis of said first delay line; an elongate sole electrode spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; and a transition element located at the intersection of said axes for coupling said delay lines one to another, the dimensions of said transitional element being selected such as to form a delay element having first and second surfaces at right angles and exposed respectively to said first and second delay lines and spaced therefrom a distance equal to respectively the periodic spacing of each of said delay line, said transitional element when viewed from each delay line having a configuration and location substantially identical to the delay elements of each said delay line.

6. In a traveling wave tube the combination comprising: an evacuated metallic housing; a first elongate interdigital delay line in said housing comprised of delay elements connected at one end to said housing; a second elongate interdigital delay line in said housing comprised of delay elements connected at one end to said housing and having a longitudinal axis at right angles to and intersecting the longitudinal axis of said first delay line; an elongate sole electrode in said housing spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; and a transition element in said housing located at the intersection of said axes forming a part of both said delay lines for coupling said delay lines one to another, said transitional element being connected at one end to said housing and the dimensions thereof being selected such as to form a delay element having first and second surfaces at right angles and exposed respectively to said first and second delay lines and spaced therefrom a distance equal to respectively the periodic spacing of each said delay line, said transitional element when viewed from each delay line having a configuration and location substantially identical to the delay elements of each said delay line, the distance between the free end of said transitional element and said housing being selected to match the impedance of said delay lines one with another.

7. In a traveling wave tube the combination comprising: an evacuated metallic housing; a first elongate interdigital delay line in said housing comprised of delay elements connected at one end to said housing; a second elongate interdigital delay line in said housing comprised of delay elements connected at one end to said housing and having a longitudinal axis displaced from the parallel to the longitudinal axis of said first delay line; and elongate sole electrode in said housing spaced from said first delay line and substantially coextensive therewith, said sole electrode and said first delay line delimiting an interaction space therebetween; an electron source at one end of said interaction space for injecting electrons into said space; an electron collecting structure at the other end of said space for collecting said electrons; a transitional element in said housing forming a part of both said delay lines for coupling said delay lines one to another, said transitional element being connected at one end to said housing and having a first end portion associated with said first delay line and a second end portion associated with said second delay line; a first surface on said first end portion and a second surface on said second end portion exposed respectively to said first and second delay lines and spaced therefrom a distance equal to the periodic spacing of each said delay line, each said surface when viewed from its respective delay line having a configuration and location substantially identical to the delay elements thereof; and an end surface forming the free end of said transitional element spaced from said housing a predetermined distance for matching the impedance of said delay lines one with another.

8. In combination: a first and second delay line of geometrically periodical structure having delay elements, the longitudinal axis of said first delay line being displaced from the longitudinal axis of said second delay line; structure defining an interaction space along said first delay line; an electron source at one end of said interaction space for injecting electrons into said space; electron collecting structure at the other end of said interaction space for collecting said electrons; and a transitional element effectively forming a part of both said delay lines for coupling said delay lines one to another, the dimensions of said transitional element being selected to match the impedance of said delay lines and form a delay element substantially the same as the delay elements in each said delay line when viewed from that delay line.

9. In combination: a first and second delay line of geometrically periodical structure having delay elements, the longitudinal axis of said first delay line being at an angle to and intersecting the longitudinal axis of said second delay line; and a transitional element located at the intersection of said axes effectively forming a part of both said delay lines for coupling said delay lines one to another, the dimensions of said transitional element being selected to match the impedance of said delay lines and form a delay element substantially the same as and in alignment with the delay elements in each said delay line when viewed from that delay line.

10. In combination: a first and second delay line of geometrically periodical structure having delay elements, the projection of each element in each said delay line on a plane passing through the axis of each said line being a rectangle whose transversal and longitudinal dimensions are in a predetermined ratio, the longitudinal axis of said first delay line being displaced from the longitudinal axis of said second delay line; and a transitional element having different portions exposed to each said delay line and effectively forming a part of both said delay lines for coupling said delay lines one to another, the dimensions of said transitional element being selected to form a delay element substantially the same as and in alignment with the delay elements in each said delay line when viewed from that delay line, the portion of said transitional element exposed to each said delay line being spaced therefrom by an amount substantially equal to the spacing of that delay line and a transversal dimension of said transitional element being selected to match the impedance of said delay lines one with another.

11. The combination as defined in claim 10 wherein said delay lines are of the interdigital type; the longitudinal axes of said delay lines are at an angle and intersect each other; and the projection of said transitional element on a plane passing through the longitudinal axis of each delay line is a rectangle whose transversal dimensions are substantially the same as the delay elements of that delay line.

References Cited in the file of this patent

UNITED STATES PATENTS

| | | |
|---|---|---|
| 2,788,465 | Bryant et al. | Apr. 9, 1957 |
| 2,807,744 | Lerbs | Sept. 24, 1957 |
| 2,861,212 | Lerbs | Nov. 18, 1958 |
| 2,897,459 | Stark | July 28, 1959 |
| 2,992,356 | Paschke | July 11, 1961 |

UNITED STATES PATENT OFFICE

CERTIFICATE OF CORRECTION

Patent No. 3,084,275 April 2, 1963

Harry F. Chapell

It is hereby certified that error appears in the above numbered patent requiring correction and that the said Letters Patent should read as corrected below.

Column 1, line 52, for "avoidid" read -- avoided --; column 6, line 36, for "the" read -- and --.

Signed and sealed this 24th day of December 1963.

(SEAL)
Attest:

ERNEST W. SWIDER
Attesting Officer

EDWIN L. REYNOLDS
Acting Commissioner of Patents